(12) United States Patent
Ziegler et al.

(10) Patent No.: US 12,313,178 B2
(45) Date of Patent: May 27, 2025

(54) FLUIDIC VALVE SUPPORTING ADDITIONAL MOVEMENT IN ADDITION TO OPENING AND CLOSING MOVEMENT

(71) Applicant: Agilent Technologies, Inc., Santa Clara, CA (US)

(72) Inventors: Tony Ziegler, Steinfeld (DE); Joachim-Richard Wagner, Ettlingen (DE); Clemens Plachetka, Malsch (DE)

(73) Assignee: Agilent Technologies, Inc., Santa Clara, CA (US)

( * ) Notice: Subject to any disclaimer, the term of this patent is extended or adjusted under 35 U.S.C. 154(b) by 242 days.

(21) Appl. No.: 18/083,425

(22) Filed: Dec. 16, 2022

(65) Prior Publication Data
US 2023/0194008 A1 Jun. 22, 2023

(30) Foreign Application Priority Data
Dec. 22, 2021 (GB) ...................... 2118796

(51) Int. Cl.
*F16K 29/00* (2006.01)
(52) U.S. Cl.
CPC .......... *F16K 29/00* (2013.01); *Y10T 137/4322* (2015.04)
(58) Field of Classification Search
CPC . F16K 29/00; F16K 99/0049; Y10T 137/4322
See application file for complete search history.

(56) References Cited

U.S. PATENT DOCUMENTS

| | | | | |
|---|---|---|---|---|
| 686,566 A * | 11/1901 | Wight | ...................... | F16K 29/00 137/331 |
| 1,021,758 A * | 4/1912 | Bosse | ...................... | F16K 29/00 137/243.2 |
| 1,260,509 A * | 3/1918 | Burge | ...................... | F16K 29/00 137/243.6 |
| 5,699,995 A | 12/1997 | Robertson, III | | |
| 7,219,691 B2 * | 5/2007 | Gethmann | .......... | F16K 37/0041 91/363 R |
| 7,537,197 B2 * | 5/2009 | Heim | ................... | F16K 99/0005 251/129.06 |
| 9,010,329 B2 | 4/2015 | Hansen | | |
| 2011/0186759 A1 * | 8/2011 | Hansen | ............... | F16K 99/0001 251/129.01 |
| 2016/0327183 A1 | 11/2016 | Binder | | |
| 2018/0246072 A1 | 8/2018 | Steinke | | |

FOREIGN PATENT DOCUMENTS

| | | | | |
|---|---|---|---|---|
| EP | 1577012 A1 | 9/2005 | | |
| WO | WO-03033206 A1 * | 4/2003 | ............. | B24B 15/02 |

OTHER PUBLICATIONS

UK Intellectual Property Office Combined Search and Examination Report under Sections 17 and 18(3) for application No. GB 2118796.8 dated Oct. 11, 2022; 12 pages.

* cited by examiner

*Primary Examiner* — Kevin F Murphy (57) ABSTRACT

A fluidic valve includes a valve seat, a valve sealing body placeable at the valve seat when the fluidic valve is closed and being displaced with respect to the valve seat when the fluidic valve is open, a force transmission element coupled with the valve sealing body, and an actuator mechanism configured for actuating the force transmission element for triggering the valve sealing body to carry out an additional movement different from an opening movement and a closing movement of the valve sealing body.

18 Claims, 5 Drawing Sheets

FLUIDIC VALVE SUPPORTING ADDITIONAL MOVEMENT IN ADDITION TO OPENING AND CLOSING MOVEMENT

RELATED APPLICATIONS

This application claims priority to UK Application No. GB 2118796.8, filed Dec. 22, 2021, the entire contents of which are incorporated herein by reference.

TECHNICAL FIELD

The present invention relates to fluidic valves, to a method of operating a fluidic valve, and to a sample separation apparatus.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high-pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation. As a result, the fluidic sample is injected into the mobile phase, such as a solvent or a solvent composition. It is important for a precise separation of the fluidic sample that the composition of the mobile phase is accurate. In order to accurately define properties of a processed mobile phase, one or more fluidic valves may be implemented in a sample separation apparatus.

However, it may happen that salt precipitates or a substance polymerizes from a mobile phase when passing a fluidic valve. This and other phenomena may contaminate valve members and may deteriorate their free mobility, which may have a negative impact on a proper valve function.

SUMMARY

It is an object of the invention to operate a fluidic valve in a failure robust way.

According to an exemplary embodiment of a first aspect of the present disclosure, a fluidic valve is provided which comprises a valve seat, a valve sealing body placeable at the valve seat when the fluidic valve is closed and being displaced with respect to the valve seat when the fluidic valve is open, a force transmission element coupled with the valve sealing body, and an actuator mechanism configured for actuating the force transmission element for triggering the valve sealing body to carry out an additional movement different from an opening movement and a closing movement of the valve sealing body.

According to another exemplary embodiment of the first aspect of the present disclosure, a method of operating a fluidic valve having the above-mentioned features is provided, wherein the method comprises moving the valve sealing body between a position at the valve seat for closing the fluidic valve and a position displaced with respect to the valve seat for opening the fluidic valve, and actuating the force transmission element by the actuator mechanism for triggering the additional movement of the valve sealing body different from the opening movement and the closing movement of the valve sealing body.

According to an exemplary embodiment of a second aspect of the present disclosure, a fluidic valve is provided which comprises a valve seat, a valve sealing body placeable at the valve seat when the fluidic valve is closed and being displaced with respect to the valve seat when the fluidic valve is open, a force transmission element coupled with the valve sealing body, an actuator mechanism configured for actuating the force transmission element for triggering the valve sealing body to carry out a reference movement, in particular an oscillation movement (for example with a frequency in a range from 0.1 Hz to 50 Hz), a sensor mechanism configured for sensing a response (for instance a damping characteristic) to the triggered reference movement, and a determining unit configured for determining information indicative of at least one parameter relating to an operation of the fluidic valve, in particular viscosity and/or flow rate of a fluid to be processed by the fluidic valve.

According to an exemplary embodiment of a third aspect of the present disclosure, a fluidic valve is provided which comprises a valve seat, a valve sealing body placeable at the valve seat when the fluidic valve is closed and being displaced with respect to the valve seat when the fluidic valve is open, a force transmission element coupled with the valve sealing body, and a sensor mechanism configured for sensing information indicative of at least one parameter relating to the operation of the fluidic valve.

According to another exemplary embodiment, a sample separation apparatus for separating a fluidic sample is provided, wherein the sample separation apparatus comprises a fluid drive for driving the fluidic sample and/or a mobile phase in which the fluidic sample is injected, a sample separation unit for separating the fluidic sample in the mobile phase, and a fluidic valve having the above-mentioned features.

In the context of the present application, the term "fluidic valve" may particularly denote a member for processing fluid functioning (in particular automatically or in a controlled way) for controlling a fluid flow through the fluidic valve. For instance, the fluidic valve may be closed to disable fluid flow through the fluidic valve, or may be opened to enable fluid flow through the fluidic valve. It is also possible that a fluidic valve is partially openable to different degrees to enable a limited fluid flow through the fluidic valve to a selectable degree.

In the context of the present application, the term "valve seat" may particularly denote a recessed member with a fluidic conduit, the recess being configured for accommodating a valve sealing body. When the valve sealing body is received in the valve seat in a sealing fashion, no fluid flow is enabled through the conduit of the valve seat so that the fluidic valve is closed. When the valve sealing body is not received in the valve seat in a sealing fashion, fluid flow is enabled through a gap between valve sealing body and valve seat and through the conduit of the valve seat so that the fluidic valve is open. Gradual open states are possible as well.

In the context of the present application, the term "valve sealing body" may particularly denote a movable member shaped and dimensioned to match with a shape and a dimension of a recess of the valve seat so that the valve sealing body can be received in the valve seat in a sealing fashion. This may disable a fluid flow between the valve seat and the valve sealing body. However, the movable valve sealing body may also be moved out of the valve seat for enabling a fluid flow between the valve seat and the valve sealing body. For instance, the valve sealing body may comprise a spherical or conical section cooperating with a spherical or conical recess of the valve sealing body. Other shapes are possible.

In the context of the present application, the term "force transmission element" may particularly denote a body or member which can be coupled with a valve sealing body for transmitting a force between valve sealing body and force transmission element. For instance, the force transmission element may be a rigid or stiff body, such as a rod or piston.

In the context of the present application, the term "actuator mechanism" may particularly denote a member or arrangement of members configured for actuating one or more other members, such as a valve sealing body, by exerting a force. Preferably, such an actuator mechanism comprises an electroactive material, but may also be embodied additionally or alternatively with a piezoelectric material. For instance, an electric signal may be applied to the actuator mechanism for activating the latter to exert a force.

In the context of the present application, the term "sensor mechanism" may particularly denote a member or arrangement of members configured for sensing or detecting a parameter when exerting a force to be detected to the sensor mechanism. For example, sensing said force may allow to derive information concerning said parameter. Preferably, such a sensor mechanism comprises an electroactive material, but may also be embodied additionally or alternatively with a piezoelectric material. For instance, an exerted force may generate an electric signal at the sensor mechanism which may be used and further processed as a sensor signal.

In the context of the present application, the term "additional movement of the valve sealing body different from the opening movement and the closing movement of the valve sealing body" may particularly denote at least one additional (for example non-unidirectional and non-longitudinal) motion mode in addition, beyond or apart from a (for example unidirectional and longitudinal) opening or closing motion of the valve sealing body. Such at least one additional movement or motion mode may be triggered for activating an additional valve function different from and in addition to the functions of opening and closing the valve.

In the context of the present application, the term "triggered reference movement" may particularly denote a predetermined movement (for instance a predetermined oscillation with defined frequency and/or amplitude) of the valve sealing body. Upon detecting the response to the application of such a triggered reference movement, information concerning valve function and/or processed fluid may be obtained. The response of the valve sealing body and hence a detected response signal may depend on properties of the surrounding of the valve sealing body (in particular of the fluid properties in said surrounding).

In the context of the present application, the term "parameter relating to an operation of the fluidic valve" may particularly denote a physical quantity providing information about the present operation of the fluidic valve. In particular, viscosity and/or flow rate of a fluid to be processed by the fluidic valve may be determined when evaluating a response of the fluidic valve to the exertion of a predefined reference movement. The term may also denote sensed information indicating how the fluidic valve operates at present. This may allow to derive information whether or not the fluidic valve functions properly, for instance in terms of function control, diagnosis and/or predictive maintenance.

In the context of the present application, the term "sample separation apparatus" may particularly denote an apparatus which is configured for separating a fluidic sample, for instance into different fractions. In particular, the sample separation apparatus may be a chromatography apparatus. When the fluidic sample is supplied to the sample separation apparatus and is injected by an injector into a separation path between fluid drive unit and sample separation unit, different physical, chemical and/or biological properties of different fractions of the fluidic sample may result in a separation of different fractions in the sample separation unit.

In the context of the present application, the term "fluid" may particularly denote a liquid and/or a gas, optionally comprising solid particles.

In the context of this application, the term "fluidic sample" (or sample fluid) may particularly denote any liquid and/or gaseous medium, optionally including also solid particles, which is to be separated. Such a fluidic sample may comprise a plurality of different molecules or particles which shall be separated, for instance small mass molecules or large mass biomolecules such as proteins. Separation of a fluidic sample may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a sample separation unit.

In the context of the present application, the term "fluid drive" may particularly denote an entity capable of driving a fluid, in particular the fluidic sample and/or the mobile phase. For instance, the fluid drive may be a pump (for instance embodied as piston pump or peristaltic pump) or another source of pressure. For instance, the fluid drive may be a high-pressure pump, for example capable of driving a fluid with a pressure of at least 100 bar, in particular at least 1000 bar.

The term "sample separation unit" may particularly denote a fluidic member through which a fluidic sample is transferred, and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample. In particular, a sample separation unit may be a tubular body.

According to an exemplary embodiment of the first aspect of the present disclosure, a fluidic valve has a valve sealing body which is sealingly placeable at or in a valve seat for closing the fluidic valve, while moving the valve sealing body out of the valve seat may open the fluidic valve. Advantageously, an actuator mechanism may apply a force to a force transmission element which may be coupled with the valve sealing body in a force transmitting manner for exciting a further motion mode of the valve sealing body in addition to and differing from the opening motion and the closing motion. Hence, the fluidic valve may support at least a third motion mode in addition to opening and closing the valve. By executing such an additional non-opening and non-closing movement, the valve sealing body may fulfil an additional function without additional hardware effort. Preferably but not necessarily, such an additional function may contribute to release or unlock an unintentionally jammed valve sealing body-valve seat arrangement. For instance, separating, releasing or unlocking a sticking valve sealing body-valve seat arrangement may be triggered by a swivelling, rotating and/or oscillating motion of the valve sealing body with respect to the valve seat, which are exemplary embodiments of the at least one additional movement mode. Descriptively speaking, the additional movement of the valve sealing body may ensure an additional mutual force and/or may create an additional friction force between valve sealing body and valve seat which may clean the fluidic valve and keep or render the fluidic valve intact even under harsh conditions (such as during online sampling in a production system). Additionally or alternatively, other functions may be supported by the at least one additional movement mode as well, for instance in terms of carrying out a reference movement as a basis for sensing a system response.

According to an exemplary embodiment of the second aspect of the present disclosure (which may or may not be combined with an embodiment according to the first aspect), a fluidic valve with valve seat, valve sealing body and force transmission element functionally collaborating with the valve sealing body may be equipped with an actuator mechanism for force the valve sealing body to execute a reference movement, such as a defined oscillation. A sensor mechanism (preferably, but not necessarily, a capacitive sensor composed of electroactive material and electrodes) may sense how the system reacts on the applied reference movement. Descriptively speaking, the excited response movement (in particular oscillation) of force transmission element and valve sealing body may depend on parameters such as viscosity and flow rate of fluid being processed by the fluidic valve. By determining such information, one or more operation parameters characterizing the present operation of the fluidic valve may be derived, for instance viscosity and/or flow rate of the presently processed fluid. In particular, such a fluidic valve may have an incorporated viscosimeter and/or flow rate sensor, so that a control of the fluidic valve may be adapted in accordance with sensed information and may thus be rendered more precise.

According to an exemplary embodiment of the third aspect of the present disclosure (which may or may not be combined with an embodiment according to the first aspect and/or the second aspect), a fluidic valve with valve seat, valve sealing body and force transmission element functionally collaborating with the valve sealing body may be provided with a sensor mechanism for sensing information characterizing a present functioning of the fluidic valve and/or individual members thereof (for instance of the force transmission element and/or of the valve sealing body). Preferably but not necessarily, the sensor mechanism may be based on an electroactive member. With such an integrated sensing function, an actual operation of the fluidic valve may be monitored and, if desired or required, the operation may be adjusted based on the sensed information, in order to comply with a target operation deviating from the actual operation.

In the following, further embodiments of the fluidic valves, the sample separation apparatus, and the method will be explained.

In an embodiment, the actuator mechanism is configured for triggering the additional motion of the valve sealing body in form of at least one of a tilting motion, a rotating motion, an (for example axial) oscillating (or vibration) motion, a tumbling motion, and a combination of at least two of the afore-mentioned motions. For instance, a tilting or swivelling motion may tilt or swivel a rod-shaped force transmission element out of a longitudinal extension or axial orientation. A rotating motion may rotate the for instance rod-shaped force transmission element around its symmetry axis. In an (in particular axial) oscillating mode, the for example rod-shaped force transmission element may vibrate (in particular along its longitudinal axis). A tumbling motion may be a precession-nutation motion. Any combination of the mentioned and/or other motion modes is possible as well, depending on a desired function.

In an embodiment, the additional movement is different from an axially longitudinal motion. Such an axial longitudinal motion in forward or backward direction may trigger a transition between an open valve state and a closed state. The additional movement may provide another function and/or may have another motion characteristic.

In an embodiment, the actuator mechanism is configured for triggering the additional motion of the valve sealing body for cleaning at least one of the valve seat and the valve sealing body, and/or for releasing the valve sealing body and the valve seat from each other. During use, medium from the processed fluid may stick to the valve sealing body and/or to the valve seat which may contaminate the valve and may deteriorate in function. The additional motion may release such contaminants from valve sealing body and/or valve seat and may therefore clean the fluidic valve. It is also possible that contaminants originating from the processed fluids (for instance precipitated solids, such as salts or polymerized material, originating from a mobile phase) accumulate between valve sealing body and valve seat and cause a sticking of the valve sealing body with respect to the valve seat, for instance when the fluidic valve remains for a longer time in a closed configuration. This may lead to a delayed opening of the valve and may therefore reduce accuracy of the processing of fluid. Even worse, the mentioned phenomena may even render the fluidic valve unusable. By the additional motion, release of the valve sealing body from the valve seat may be achieved even in the event of contamination and/or precipitation of foreign particles.

In an embodiment, the force transmission element comprises a rod. Such an elongate rod or piston may be arranged for moving forwardly or backwardly for opening or closing the fluidic valve, respectively.

Figure 2:
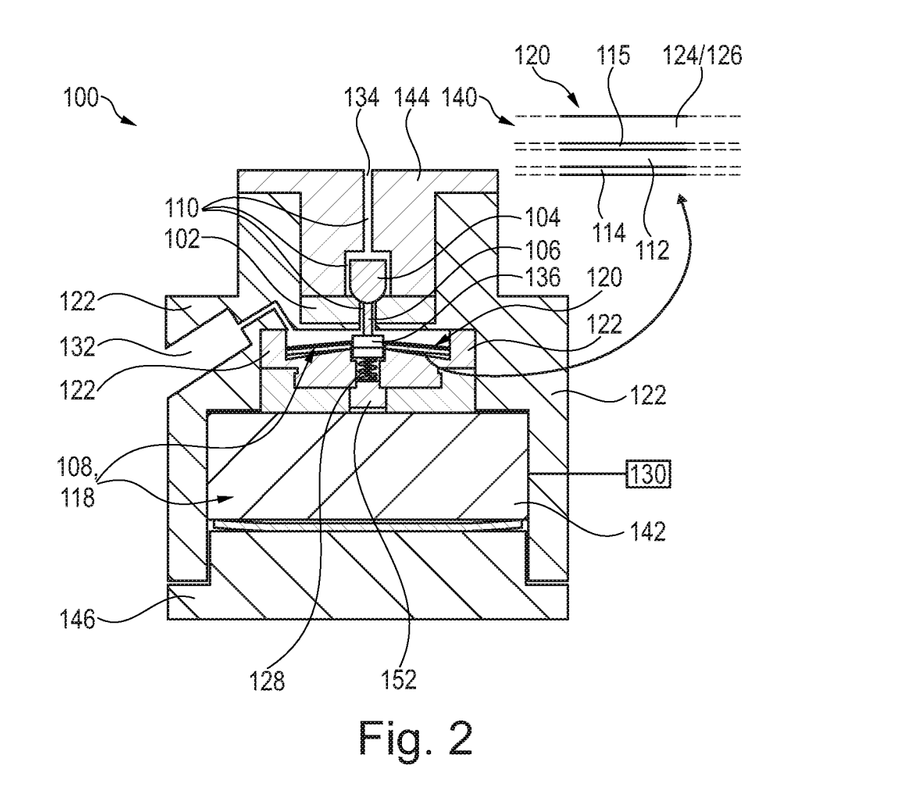
FIG. 2 shows a cross-sectional view of a fluidic valve according to an exemplary embodiment of the present disclosure in a first operation mode.

In an embodiment, the force transmission element and the valve sealing body are fixedly connected with each other, in particular are integrally formed (see for example FIG. 2). In particular, a rod-shaped force transmission element and a valve sealing body having a spherical section may be rigidly connected so that the motion of one of the force transmission element and the valve sealing body leads to a motion of the other one. Such a rigidly coupled valve sealing body-force transmission element configuration may be a mechanically simple and reliable embodiment.

Figure 11:
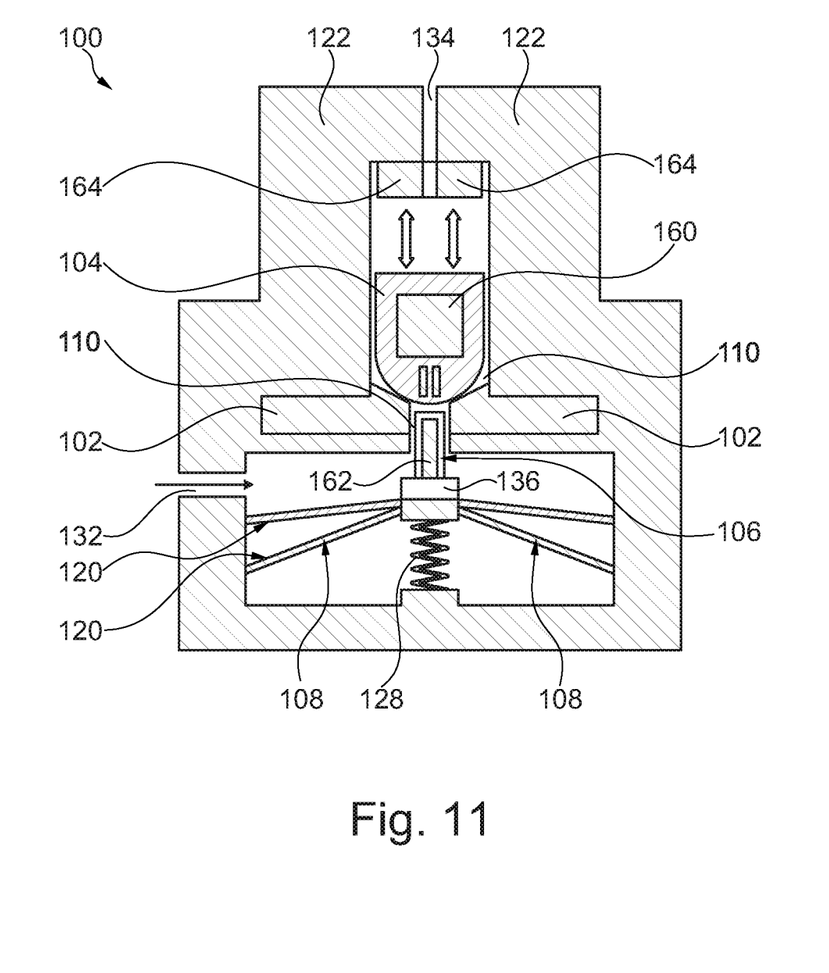
FIG. 11 shows a cross-sectional view of a fluidic valve according to still another exemplary embodiment of the present disclosure.

In another embodiment, the force transmission element and the valve sealing body are physically separate from each other and nevertheless functionally (in particular magnetically, or by a mechanical spring) coupled with each other (see for example FIG. 11). For example, repellent magnets may be implemented both in the valve sealing body and in the force transmission element when embodied as separate members. When the actuator mechanism exerts a force to the force transmission element moving the latter towards the valve sealing body, the repellent magnetic force between said repellent magnets may move the valve sealing body, approached by the force transmission element, away from the force transmission element. In such an embodiment, it may also be advantageous to implement at least one further repellent magnet in a portion of a housing of the fluidic valve facing the valve sealing body and facing away from the force transmission element. This may ensure that the valve sealing body returns into the valve seat in the absence of a force exerted by the force transmission element, thereby ensuring a normally closed configuration of the fluidic valve.

In an embodiment, functionally cooperating portions of the valve sealing body and the valve seat are spherical. Consequently, a sealing configuration between the valve sealing body and the valve seat may be achieved when the valve sealing body is driven into the valve seat. However, such a form closure between valve seat and valve sealing body in the closed configuration of the fluidic valve may also be achieved with non-spherical geometries, for instance matching conical shapes of valve seat and valve sealing body.

In an embodiment, the force transmission element extends through a fluidic conduit fluidically connected to the valve seat. For example, a rod-shaped force transmission element may extend through a conduit in fluid communication with the valve seat while maintaining a fluid-passage gap in between. This may allow to control the valve sealing body coupled with the force transmission element from a position being spaced with respect to the valve sealing body and through the valve seat.

In an embodiment, the actuator mechanism comprises at least one of the group consisting of an electroactive material, in particular an electroactive polymer, and a piezoelectric element. While the use of an electroactive material may be preferred, other actuator mechanisms using piezoelectric material and/or a solenoid may be implemented as well. In the context of the present application, the term "electroactive material" may particularly denote a material which exhibits a change in size or shape when stimulated by an electric field. Preferably, such an electroactive material may be an electroactive polymer (EAP). Advantageously, such an electroactive material may be configured as actuator and/or sensor. An advantageous property of an EAP is that it may undergo a large amount of deformation while sustaining large forces. For instance, an EAP may be embodied with silicone. In the context of the present application, the term "silicone" or polysiloxane may particularly denote polymers made up of siloxane and may be a rubber-like substance. Preferably, the silicone may be fluorosilicone (for instance fluoroalkylsilicone, fluoro-vinyl-methyl-silicone, etc.). Other examples are methyl silicone, vinyl methyl silicone, phenyl-vinyl-methyl-silicone, phenyl-modified silicone, etc. Advantageously, silicone has a high mechanical durability and a high electrical resistance. Especially in the temperature range from −20° C. to 120° C., the Young modulus is quite independent from temperature variations. Hence the operation is not influenced by temperature dependent changes of stiffnesses. The electroactive polymer based device may be actuator and sensor at the same time which is one of its major advantages over conventional technologies. In other embodiments, the electroactive material may be only actuator or only sensor.

In an embodiment, the actuator mechanism comprises an electroactive layer between two electrode layers. Hence, the actuator mechanism may comprise a multilayer stack with a capacitor-like configuration. A dielectric electroactive layer may be arranged between two opposing electrode layers, which may be made of an electrically conductive polymer (such as electrically conductive silicone). When generating an electric field at the position of the electroactive layer by applying an electric voltage to the electrode layers, the electroactive property may lead to a structural change of the electroactive layer (in particular an elongation or a contraction). This may create, in turn, an actuating force to the force transmission element.

Additionally or alternatively, the mentioned multilayer stack with capacitor-like configuration may be used as a sensor mechanism. When exerting a mechanical force to the electroactive layer leading to a structural change of the electroactive layer (in particular an elongation or a contraction), a capacitor between the two opposing electrode layers will be modified characteristically. Hence, an electric signal altered by the changed capacity between the electrode layers may be indicative of a force exerted to the force transmission element and hence to the electroactive layer. Thus, the fluidic valve may comprise a sensor mechanism configured for sensing information indicative of at least one parameter relating to an operation of the fluidic valve.

Figure 8:
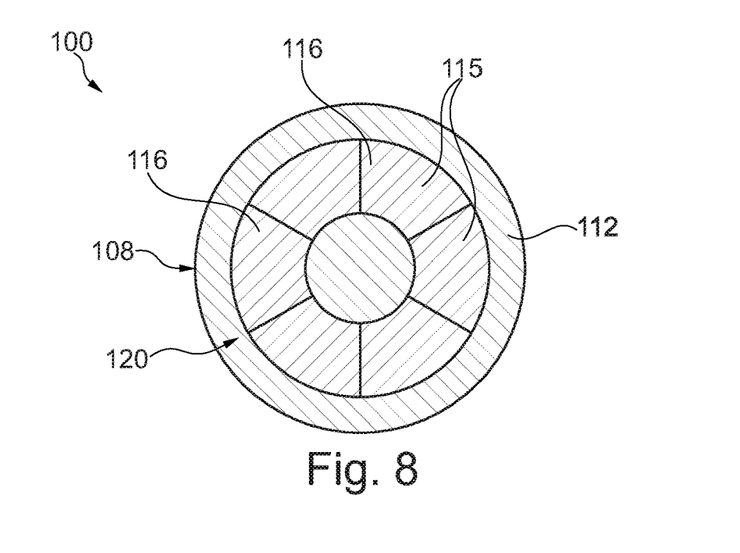
FIG. 8 shows a plan view of part of a fluidic valve according to yet another exemplary embodiment of the present disclosure.

In an embodiment, at least one of the electroactive layer and the electrode layers is divided into segments, each segment being actuable individually (compare for example FIG. 8). Advantageously, segmenting one or both of the electrode layers may allow to separately or individually manipulate each corresponding segment of the electroactive layer in a controlled way. This may allow to exert spatially and time dependent forces to the electroactive layer or segments thereof, thereby allowing in particular to carry out precisely controllable non-longitudinal motions of the force transmission element in the context of the above-mentioned additional movement. When configured as sensor assembly, the mentioned segmented configuration may allow for a spatially dependent sensing.

Figure 5:
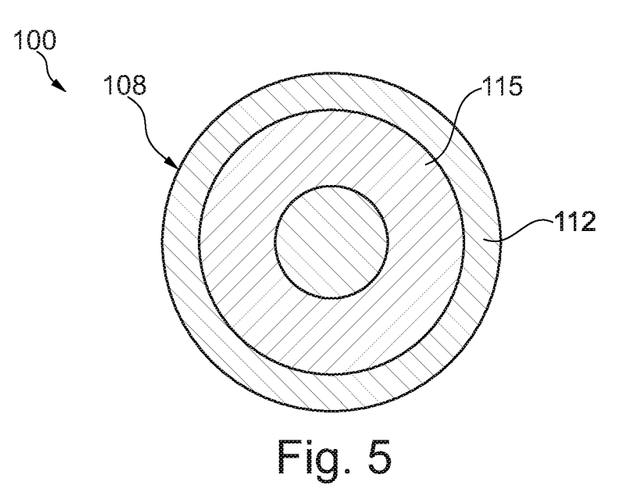
FIG. 5 shows a plan view of part of a fluidic valve according to another exemplary embodiment of the present disclosure.

In an embodiment, the electroactive layer and the electrode layers form a continuous layer sequence (compare for example FIG. 5). Hence, also a non-segmented configuration of the electroactive layer and/or the electrode layers is possible, which may reduce the control effort.

In an embodiment, the actuator mechanism and the sensor mechanism form an integrally combined actuator-sensor mechanism. For this purpose, it may be advantageous that the actuator mechanism and the sensor mechanism comprise an electroactive material, in particular an electroactive polymer. Advantageously, an electroactive layer between two electrode layers may function simultaneously as sensor and actuator. This may allow to refine the functionality of the fluidic valve and to manufacture it at the same time in a highly compact way.

In an embodiment, the fluidic valve comprises a membrane including at least part of the actuator mechanism. Such a membrane may also comprise the above-mentioned multilayer stack with a dielectric electroactive layer arranged between two opposing electrode layers. Consequently, a flexible or elastic membrane with integrated capacitor-like configuration of an electroactive layer between electrode layers may be used for actuating and/or sensing purposes. The flexibility or elasticity of such a membrane may have the advantage that the actuating and/or sensing function may be provided with high efficiency and accuracy.

In an embodiment, the membrane is fixed at a housing of the fluidic valve. For instance, the membrane may be circumferentially fixed at the housing, while a central portion of the membrane may be functionality coupled with the force transmission element for actuating and/or sensing purposes.

In an embodiment, the membrane comprises a protection layer being resistant against chemically aggressive fluid. Hence, such a protection layer of the membrane may provide compatibility with aggressive chemicals (for instance aggressive solvents of a mobile phase) and/or biocompatibility (for instance to achieve compliance with biological media processed with the fluidic valve).

In an embodiment, the membrane comprises a sealing layer for sealing the membrane against permeation of fluid. Hence, the multilayer membrane may also comprise a layer being impermeable for fluid so that leakage of fluid processed by the fluidic valve may be reliably prevented.

Protection layer and sealing layer may be separate layers. However, it is also possible that the functions of the protection layer and of the sealing layer are provided by a common protection and sealing layer.

In an embodiment, the membrane is arranged to couple the actuator mechanism with the force transmission element. For instance, the force transmission element may be rigidly connected to the membrane directly or indirectly (for instance with a connection block in between).

In an embodiment, the fluidic valve comprises a biasing element, in particular a biasing spring, for biasing the valve sealing body towards the valve seat, wherein the force transmission element is arranged between the biasing element and the valve sealing body. Highly advantageously, the biasing element may be arranged facing away from the valve sealing body. This may allow to miniaturize the fluidic valve and to enable a low energy operation.

In an embodiment, the actuator mechanism is configured for triggering the additional movement around a center of the valve sealing body and/or around an axis of the force transmission element. It has turned out that such additional motion modes are highly efficient for cleaning and releasing purposes of valve sealing body and valve seat.

In an embodiment, the fluidic valve is configured as at least one of the group consisting of a check valve, a passive valve, and an active valve. A check valve may—for example in a controlled or in an automatic way—allow a fluid flow only in one direction and may disable any fluid flow in an opposite direction. A passive valve may function without active control. In contrast to this, an active valve can be actively controlled by an electric control unit for executing a valve function in accordance with applied control signals.

In an embodiment, the fluidic valve is configured so that the valve seat and the valve sealing body assume a mutually bistable configuration. Hence, the arrangement composed of valve seat and valve sealing body may have two stable configurations, i.e. the closed configuration of the fluidic valve and the open configuration of the fluidic valve. Other intermediate configurations may be unstable. This may ensure that the fluidic valve assumes, in equilibrium, one of two well defined states. In another embodiment, the fluidic valve can be configured to allow also any possible intermediate state.

In an embodiment, the sensor mechanism is configured for sensing information allowing a diagnosis concerning operation of the fluidic valve, in particular whether or not the fluidic valve operates properly. In particular when a sensing mechanism is provided (preferably by an electroactive material), sensor signals may be processed for evaluating whether the fluidic valve functions as desired or expected. Thus, sensed information may be used as a basis for a failure diagnosis. Examples for diagnosed failures are an excessive or a too low flow rate, an unexpectedly high viscosity of processed fluid, and/or the presence of air bubbles in the processed fluid. All these phenomena can be detected by a corresponding characteristic behaviour of a sensor signal, for instance captured by an electroactive layer between two opposing electrode layers. For instance, it may be possible to analyse how pressure conditions in a suction path of the fluidic valve change in view of certain undesired phenomena (such as blockage of a fluidic path, inappropriate viscosity of processed fluid, the presence of air bubbles, etc.).

In an embodiment, the fluidic valve forms part of the fluid drive, in particular is configured as active inlet valve of the fluid drive. For example for applications such as a liquid chromatography separation apparatus (more specifically an HPLC), a fluid drive may function as an analytical pump and may provide a mobile phase (such as a solvent composition) at a high pressure (in particular at a pressure above 500 bar, more particularly above 1200 bar). For example, such a fluid drive may comprise two (or more) serially (and/or parallel) coupled piston pumps. When mobile phase enters such a fluid drive, operation of the fluid drive (in particular its individual piston pumps) shall be controlled, in particular synchronized. For this purpose, one or more fluidic valves may be implemented, which may also involve an inlet valve configured according to exemplary embodiment of the present disclosure, as described herein.

Embodiments of the present disclosure may be implemented in conventionally available HPLC systems, such as the Agilent 700 (or 1290) Series Rapid Resolution LC system or the Agilent 1150 HPLC series (both provided by the applicant Agilent Technologies—see www.agilent.com).

One embodiment of a sample separation apparatus comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The separation unit of the sample separation apparatus preferably comprises a chromatographic column (see for instance en.wikipedia.org/wiki/Column_chromatography) providing a stationary phase. The column may be a glass, polymer or steel tube (for instance with a diameter from 50 μm to 5 mm and a length of 1 cm to 1 m) or a microfluidic column (as disclosed for instance in EP 1577012 or the Agilent 700 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process sample portions in the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the pump, in the mobile phase may range from 2-200 MPa (20 to 2000 bar), in particular 10-150 MPa (150 to 1500 bar), and more particularly 50-70 MPa (500 to 700 bar).

The sample separation apparatus, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 700 Series Rapid Resolution LC system or the Agilent 1150 HPLC series, both provided by the applicant Agilent Technologies, under www.agilent.com.

Embodiments of the present disclosure can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present disclosure will be readily appreciated and become better understood by reference to the following more detailed description of embodiments in connection with the accompanying drawings. Features that are substantially or functionally equal or similar will be referred to by the same reference signs.

The illustrations in the drawings are schematic.

DETAILED DESCRIPTION

Before describing the figures in further detail, some basic considerations of the present disclosure will be summarized based on which exemplary embodiments have been developed.

A conventional HPLC check valve may use a ball which may be ground-in (and thereby matched) to a V-shaped surface of a seat structure. A spring load may firmly close the ball-seat combination against a high liquid pressure from the spring side. However, a force necessary for opening such a check valve may be high, which may render operation cumbersome or problematic.

According to an exemplary embodiment of the present disclosure, a reduction in force required to open a fluidic valve (such as a check valve) may be achieved. This may be accomplished by operating the fluidic valve using an actuator mechanism involving at least one additional movement in addition to an opening or closing movement of the fluidic valve Thus, operation of such a fluidic valve may be reliable and simple.

Advantageously, less force may be sufficient to open the fluidic valve (for instance embodied as check valve). Consequently, it may be possible to provide a small and simple acting apparatus or actuation mechanism. This may reduce the manufacturing effort of the fluidic valve. Furthermore, the described configuration of exemplary embodiments of the present disclosure may make it possible to save energy, especially when such an embodiment is applied together with a DEA (Dielectric Elastomer Actuator). Advantageously, a virtual bi-stable operation may be made possible when using a DEA as force generator. Moreover, the described design of a fluidic valve of an exemplary embodiment of the present disclosure may lead to a long lifetime, since a fine dosing of required forces is possible. As a consequence, no frequent changing of a fluidic valve (such as a check valve) cartridge is necessary. In an embodiment, it may be possible to provide only a sealing cartridge with no parts inside, implying that a reduction of dead volume is intrinsic to corresponding embodiments of the present disclosure. Furthermore, exemplary embodiments of the present disclosure may reduce the case size which may lead to a miniaturization of the fluidic valve. Highly advantageously, a self-cleaning function may be achievable by operating a force transmission element and consequently a valve sealing body (for instance made of ruby, ceramic, etc.) with an additional movement provided by an actuator mechanism (for instance a high frequency movement).

Hence, a gist of exemplary embodiments of the present disclosure may be seen in the provision of a fluidic valve (such as a ball valve) having a valve sealing body (for instance a ball) for either opening or closing a flow path extending through the fluidic valve. The valve sealing body may be fixedly (for instance by an integrally formed configuration) or loosely (for instance by a contact-free magnetic coupling mechanism) coupled with a force transmission element (such as a rod or piston) allowing to actively place or displace the valve sealing body with respect to a (for example spherical) valve seat (for opening or closing the flow path). Highly advantageously, it may be possible to provide an additional movement (beyond opening and closing) to the valve sealing body, such as a rotational or swivelling movement, for instance around the center of the valve sealing body and/or around the axis of the force transmission element. This may allow to provide an additional function such as cleaning of the valve sealing body and/or valve seat, and/or avoiding sticking of the valve sealing body to the valve seat. Such an additional movement may be preferably accomplished by an actuator mechanism comprising an EAP (electroactive polymer) material, but other mechanisms may be applied accordingly in other embodiments. The implementation of an EAP may be preferred in view of its high accuracy and capability of combining its actuator function with a sensor function. Thus, a fluidic valve according to an exemplary embodiment of the present disclosure may use EAP materials, wherein such a fluidic valve may provide an additional motion beyond opening/closing. Hence, exemplary embodiments of the present disclosure may provide a fluidic valve (which may operate active or passive) having an electroactive polymer mechanism to open/close and/or unstuck the valve sealing body with respect to the valve seat. In a preferred embodiment of the present disclosure, said EAP may be part of a membrane and may allow to swivel the valve sealing body against the valve seat, for instance by pulling on one side leading to a swivelling of the spherical end piece. This allows for example cleaning the fluidic valve in a quick, simple and reliable way without additional hardware effort.

In another embodiment, a fluidic valve may be provided which has a combined actuator and sensor mechanism, preferably embodied using an electroactive member. The actuator mechanism may apply an operation force to a force transmission element of the fluidic valve in a precise and simple way. Furthermore, the sensor mechanism may apply a reference movement to the force transmission element and consequently to the valve sealing body and may measure a response of the system composed of fluidic valve and processed fluid. Said response may in particular depend on viscosity and flow rate of the fluid, which parameter(s) can thereby be derived by the sensor mechanism. This information may be used, in turn, for regulating operation of the fluidic valve by the actuator mechanism.

In yet another embodiment, the actuator mechanism of the fluidic valve may even be dispensable, and a mere sensor function may be provided which may advantageously make use of an electroactive member. This may allow to monitor operation of the fluidic valve based on detected sensor signals, and optionally a diagnosis of a malfunction.

Figure 1:
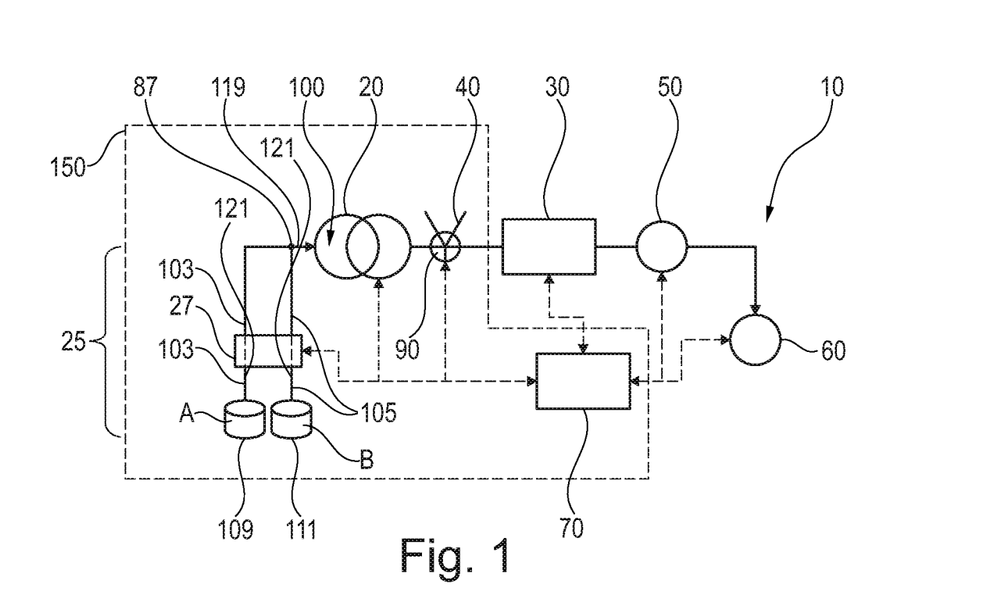
FIG. 1 shows a liquid sample separation apparatus in accordance with embodiments of the present disclosure, particularly used in high performance liquid chromatography (HPLC).

Referring now in greater detail to the drawings, FIG. 1 depicts a general schematic of a liquid separation system as example for a sample separation apparatus 10 according to an exemplary embodiment of the present disclosure. A pump or fluid drive 20 receives a mobile phase from a solvent supply 25 via a degasser 27, which degases and thus reduces the amount of dissolved gases in the mobile phase. The mobile phase pump or fluid drive 20 drives the mobile phase through a sample separation unit 30 (such as a chromatographic column) comprising a stationary phase. A sampler or injector 40, implementing an injector valve 90, can be provided between the pump 20 and the separation unit 30 in order to subject or add (often referred to as sample introduction) a sample fluid into the mobile phase so that a mixture of fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition of the mobile phase may be kept constant over time, the so-called isocratic mode, or varied over time, the so-called gradient mode.

A data processing unit or control unit 70, which can be a PC or workstation, may be coupled (as indicated by the dotted arrows) to one or more of the devices in the sample separation apparatus 10 in order to receive information and/or control operation. For example, the control unit 70 may control operation of the fluid drive 20 (for example setting control parameters, for instance of a fluidic valve 100 according to an exemplary embodiment, as described below in further detail) and receive therefrom information regarding the actual working conditions (such as output pressure, etc. at an outlet of the fluid drive 20). The control unit 70 may also control operation of the solvent supply 25 (for example setting the solvent/s or solvent mixture to be supplied) and of the degasser 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provides data back.

FIG. 1 also shows a liquid supply device 150 configured for metering liquids in controlled proportions and for supplying a resultant mixture as mobile phase. The liquid supply device 150 comprises in the shown example two reservoirs 109, 111 each containing a respective solvent component A (in this example water), B (in this example a buffer, i.e. salt dissolved in a solvent) both constituting a gas-containing liquid 121 to be at least partially degassed by degasser 27. Moreover, it is possible to provide one or more additional reservoirs, for instance an additional reservoir comprising an organic solvent, a further reservoir comprising an optional organic modifier, etc. (not shown). Each of the reservoirs 109, 111 is fluidically connected via a respective liquid supply line 103, 105 and via the degasser 27 with a proportioning unit 87 which may be configured as proportioning valve. The proportioning unit 87 is configured to connect a selected one of the liquid supply lines 103, 105 with a supply line or conduit 119 guiding towards the fluid drive 20, and to switch between different liquid supply lines 103, 105. The supply line or conduit 119 is connected with an inlet of the fluid drive 20. Hence, solvent blending is performed at the low-pressure side of the fluid drive 20 by metering or proportioning a sequence of fluidic portions.

As already mentioned above, one or more fluidic valves 100 may be provided in the sample separation apparatus 10. In particular, a fluidic valve 100 according to an exemplary embodiment of the present disclosure may form part of the fluid drive 20. Such a fluidic valve 100 may be preferably configured as active inlet valve of the fluid drive 20 which may be actively controlled for defining time intervals during which a flow of mobile phase into the fluid drive 20 is enabled or disabled, depending on a state of the fluidic valve 100. The afore-mentioned application may be preferred. Additionally or alternatively, one or more fluidic valves 100 may be provided in different members of the sample separation apparatus 10, for instance may form part of the proportioning unit 87, the injector 40 and/or the injector valve 90.

FIG. 2 to FIG. 11, which will be described in the following in detail, illustrate different embodiments of a fluidic valve 100, which may be implemented for instance for one or more of the aforementioned purposes, in particular as part of fluid drive 20.

Figure 3:
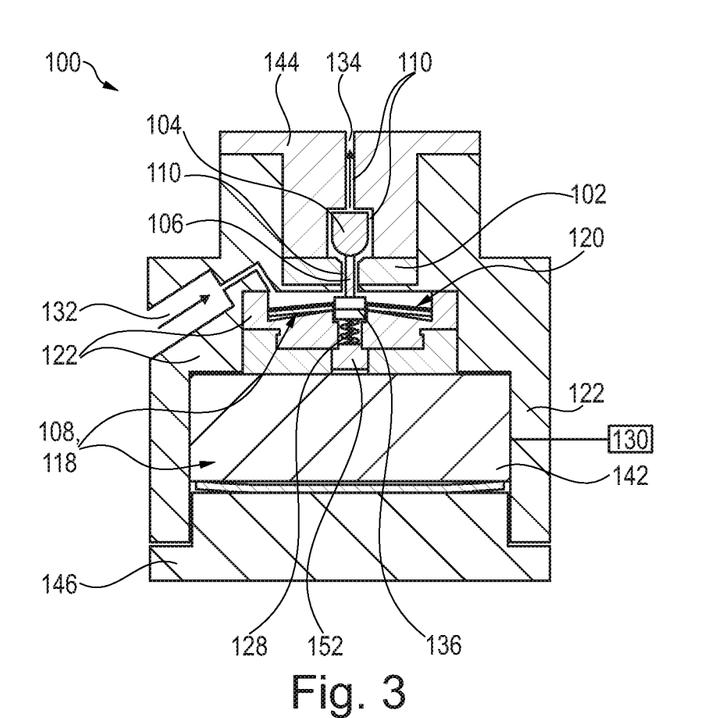
FIG. 3 shows a cross-sectional view of the fluidic valve according to FIG. 2 in a second operation mode.
Figure 4:
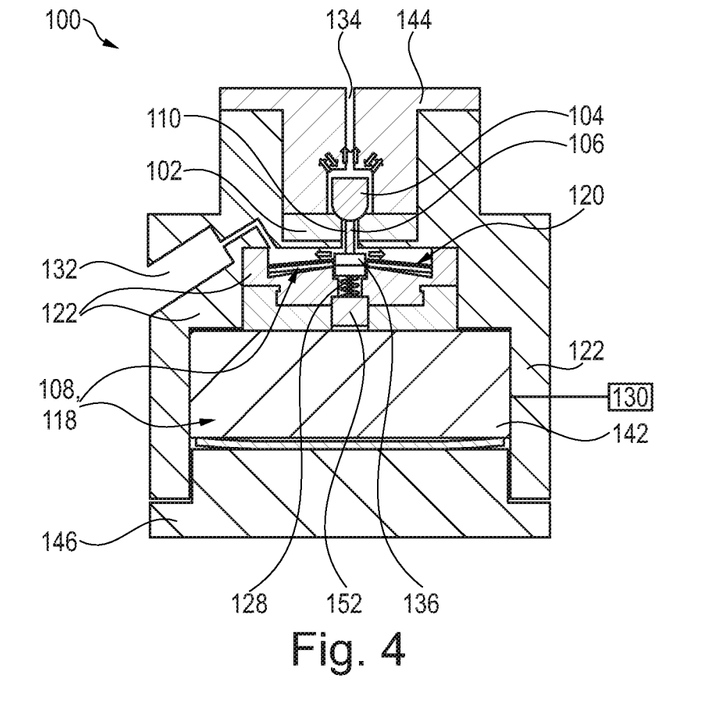
FIG. 4 shows a cross-sectional view of the fluidic valve according to FIG. 2 and FIG. 3 in a third operation mode.

FIG. 2 shows a cross-sectional view of a fluidic valve 100 according to an exemplary embodiment of the present disclosure in a first operation mode which corresponds to a closed valve configuration disabling fluid flow through the fluidic valve 100. More specifically, FIG. 2 shows an active inlet valve setup (with the fluidic valve 100 being in a closed, for instance normally closed, configuration). FIG. 3 shows a cross-sectional view of the fluidic valve 100 according to FIG. 2 in a second operation mode which corresponds to an open valve configuration enabling fluid flow through the fluidic valve 100 (as indicated by arrows in FIG. 3). The operation mode according to FIG. 3 may be denoted as an active inlet valve setup in an open valve mode (in particular an actuator active configuration). FIG. 4 shows a cross-sectional view of the fluidic valve 100 according to FIG. 2 and FIG. 3 in a third operation mode in which an additional movement mode different from an opening or closing movement is activated (as indicated by arrows in FIG. 4). In particular, possible ball-shaft movements are shown in FIG. 4 which may be activated depending on a type of DEA used in an actuator mechanism 108 of the fluidic valve 100, as described below. In view of the well-defined closed valve configuration of FIG. 2 and the well-defined open valve configuration of FIG. 3, the fluidic valve 100 is configured so that valve seat 102 and valve sealing body 104 assume a mutually bistable configuration. While the additional movements according to FIG. 4 do not correspond to a stable position of the valve sealing body 104, they provide an additional functionality in terms of cleaning and promotion of release of the system composed of valve sealing body 104 and valve seat 102.

More specifically, the fluidic valve 100 according to FIG. 2 to FIG. 4 comprises a stationary valve seat 102 mounted in a housing 122. Valve seat 102 is provided with a recess configured for accommodating a corresponding portion of a movable valve sealing body 104. For instance, the recess and the portion may both have a spherical shape. Consequently, the valve sealing body 104 is placeable in a sealing manner at or in the valve seat 102 when the fluidic valve 100 is closed for disabling fluid flow, as shown in FIG. 2. Furthermore, the valve sealing body 104 may be displaced upwardly with respect to the valve seat 102 when the fluidic valve 100 is opened for enabling fluid flow, as illustrated in FIG. 3. In the open configuration of FIG. 3, a fluid (such as a mobile phase, for instance a solvent composition) may flow from a valve inlet 132 through a fluidic conduit 110 inside of the fluidic valve 100 towards and through a valve outlet 134. In the closed configuration of FIG. 2, such a fluid flow is disabled due to the sealing accommodation of the valve sealing body 104 in the valve seat 102.

In order to move the valve sealing body 104 between the configurations shown in FIG. 2 to FIG. 4, a rod-shaped or piston-shaped force transmission element 106 is rigidly coupled with the valve sealing body 104. For example, valve sealing body 104 may be integrally formed with force transmission element 106 for promoting a direct force transmission between said members. More specifically, a first end of the force transmission element 106 may be directly physically connected with the valve sealing body 104 and may extend for this purpose through a portion of the fluidic conduit 110 extending through the valve seat 102.

Apart from this, an opposing second end of the force transmission element 106 can be directly physically connected with a block 136 connecting the force transmission element 106 with an actuator mechanism 108. The actuator mechanism 108 is configured for actuating the force transmission element 106. The actuator mechanism 108 may be configured for moving the force transmission element 106 into the closed valve configuration of FIG. 2, into the open valve configuration of FIG. 3 or may provide kinetic energy for an additional operation mode as shown in FIG. 4.

In said additional operation mode, the actuator mechanism 108 may be configured for triggering the valve sealing body 104 to carry out an additional movement different from the opening movement of the valve sealing body 104 to bring the fluidic valve 100 in the configuration according to FIG. 2 and different from the closing movement of the valve sealing body 104 to bring the fluidic valve 100 in the configuration according to FIG. 3. For converting the fluidic valve 100 between the configurations according to FIG. 2 and FIG. 3, the valve sealing body 100 may be moved longitudinally, i.e. upwardly or downwardly according to FIG. 2 and FIG. 3. The additional movement of the valve sealing body 104 in accordance with the arrows shown in FIG. 4 may deviate from said merely longitudinal motion. For instance, the actuator mechanism 108 may be controlled for triggering the additional motion of the valve sealing body 104 in form of a tilting motion and/or a rotating motion and/or an oscillating motion and/or a tumbling motion. In particular, the actuator mechanism 108 may be advantageously controlled by an electric control unit 142 for triggering an additional movement around a center of the valve sealing body 104 and/or around an axis of the force transmission element 106. For example, control unit 142 may be accommodated within housing 122 and may be fixed in place in a protected way by attaching a housing lid 146 to housing 122. With the afore-mentioned additional motion of the valve sealing body 104, it may be possible to efficiently clean the valve seat 102 and the valve sealing body 104 from contamination by creating a mutual friction force between the valve seat 102 and the valve sealing body 104. Such a contamination may result from medium of the processed fluid adhering to the valve seat 102 and/or to the valve sealing body 104 during operation of the fluidic valve 100. A contamination may occur for instance due to a precipitation of a salt from a solvent of a mobile phase being processed as fluid by the fluidic valve 100. It may even happen that the valve sealing body 104 and the valve seat 102 stick to each other due to the mentioned and/or other contaminants, which may disturb a proper mutual motion between valve sealing body 104 and valve seat 102 in accordance with a desired operation of fluidic valve 100. In order to overcome such a sticking and/or impurity, it may be possible to release the valve sealing body 104 and the valve seat 102 from each other by the above-described additional motion mode. As shown in FIG. 4, the fluidic valve 100 is preferably in the closed valve configuration (see FIG. 2) when exerting the additional motion which may have a swivelling and/or rotating and/or vibrating motion component. Since the valve sealing body 104 is accommodated in the valve seat 102 while experiencing said additional movement, a high frictional force is generated between valve sealing body 104 and valve seat 102 by the additional movement which removes foreign materials in between and thereby cleans and releases the valve sealing body 104 with respect to the valve seat 102.

Actuator mechanism 108 can be operated to move the valve sealing body 104 into the closed configuration of FIG. 2, can move the valve sealing body 104 into the open configuration of FIG. 3, and can move the valve sealing body 104 for executing the additional movement according to FIG. 4.

Highly advantageously, the above-mentioned actuator mechanism 108 may comprise an electroactive material, such as an electroactive polymer, for instance based on silicone. Although an electroactive material may be preferred, it is possible to use, additionally or alternatively, a piezoelectric element for constructing the actuator mechanism 108. As illustrated in a detail 140 of FIG. 2, the actuator mechanism 108 may be partially integrated in a flexible or elastic diaphragm or membrane 120. Said membrane 120 may be embodied as multilayer stack and may comprise an electroactive layer 112 between a first electrode layer 114 and a second electrode layer 115. Hence, the layer stack composed of the electrically insulating electroactive layer 112 being sandwiched between the electrode layers 114, 115 may form a capacitor structure. For actuating the electroactive layer 112 and therefore the membrane 120 as a whole, a corresponding electric signal may be applied to the electrode layers 114, 115 under control of electric control unit 142. As a result, a force will be exerted to the electroactive layer 112 which will move the membrane 120, and via the block 136 and the force transmission element 106, and also the valve sealing body 104. By adjusting the electric excitation signal applied by the electric control unit 142 to the electrode layers 114, 115, the motion properties may be adjusted, and hence any of the operation modes shown in FIG. 2 to FIG. 4 may be activated.

Optionally, the capacitor structure in combination with the electric control unit 142 may also function as a sensor mechanism 118 configured for sensing information indicative of at least one parameter relating to an operation of the fluidic valve 100. When the electroactive layer 112 moves into or rests in a certain configuration, a corresponding electric signal at electrode layers 114, 115 may be characteristically influenced or manipulated. Hence, detecting an electric sensor signal between the electrode layers 114, 115 may allow to determine information about a certain operation state of the fluidic valve 100. The task of processing the sensor signals for determining information may be carried out by a determining unit 130, such as a processor.

A further advantageous sensor application of the fluidic valve 100 according to FIG. 2 to FIG. 4 will be described in the following: The actuator mechanism 108 may also be controlled, by control unit 142, for actuating the force transmission element 106 for triggering the valve sealing body 104 to carry out a reference movement. For example, said reference movement may be an upwards-downwards oscillation movement of the valve sealing body 104 with a certain frequency of for instance 50 Hz. Said reference movement will be influenced by the fluidic properties of the surrounding of the valve sealing body 104, in particular by flow rate and viscosity of the processed fluid around the valve sealing body 104. The sensor mechanism 118 may be configured for sensing a response to the triggered reference movement, i.e. may measure a signal involving the capacitance between the electrode layers 114, 115 for deriving information regarding how the system behaves in response to the excited reference movement. The response signal may depend on fluidic parameters such as flow rate and viscosity of the fluid processed by the fluidic valve 100 and may therefore allow to derive corresponding information. Hence, determining unit 130 may also be configured for determining information indicative one or more parameters relating to an operation of the fluidic valve 100, such as viscosity and/or flow rate of a fluid to be processed by the fluidic valve 100. Thus, fluidic valve 100 according to FIG. 2 to FIG. 4 may also function as viscosimeter and/or flow rate measurement device.

In yet another embodiment, it is also possible to configure or use the arrangement of the electroactive layer 112 between the electrode layers 114, 115 only as a sensor mechanism 118, but not as an actuator mechanism 108. A corresponding sensor mechanism 118 may be configured for sensing information indicative of one or more parameters relating to the force transmission element 106 being, in turn, connected with the valve sealing body 104 during operation of the fluidic valve 100. Sensed information may be used for making a diagnosis concerning operation of the fluidic valve 100, in particular whether or not the fluidic valve 100 operates properly.

However, it may be preferred to use the integrally combined actuator-sensor mechanism in form of actuator mechanism 108 and sensor mechanism 118 both for actuating and sensing purposes, which may be made possible thanks to the electroactive material supporting both functions.

Referring again to membrane 120 forming part of the actuator mechanism 108, said membrane 120 may be circumferentially fixed at housing 122 of the fluidic valve 100. A central portion of membrane 120 is connected with block 136 accomplishing force transmission between membrane 120 and force transmission element 106. Hence, the membrane 120 may be arranged to couple the actuator mechanism 108 with the force transmission element 106.

Again referring to detail 140, the multilayer stack of membrane 120 may additionally comprise a protection layer 124 being resistant against chemically aggressive fluid, such as organic solvent. Protection layer 124 may be arranged on a side of the membrane 120 facing the fluid processed by the fluidic valve 100. Additionally or alternatively, the membrane 120 may comprise a sealing layer 126 for sealing the membrane 120 against permeation of fluid. Consequently, membrane 120 may also function as sealing membrane for preventing leakage. When present, sealing layer 126 may be arranged on a side of the membrane 120 facing the fluid processed by the fluidic valve 100. As shown in detail 140, protection layer 124 and sealing layer 126 may also be embodied as a common single layer fulfilling both functions.

For example, electroactive layer 112 may have a thickness of 50 μm, first electrode layer 114 may have a thickness of 10 μm, second electrode layer 115 may have a thickness of 10 μm, and layer(s) 124/126 may have a thickness of 200 μm.

As also shown in FIG. 2 to FIG. 4, fluidic valve 100 may be equipped with a biasing element 128 for biasing the valve sealing body 104 towards the valve seat 102. Biasing element 128 may be preferably embodied as biasing spring or alternatively as array of biasing magnets. When embodied as spring, biasing element 128 may for instance be a helical spring or a leaf spring. Such a spring may for instance be made of a metallic or plastic material. It may be preferable that such a spring be configured as negative biased spring (NBS).

Advantageously, the force transmission element 106 is arranged between the biasing element 128 and the valve sealing body 104. Consequently, no spring is foreseen between the valve sealing body 104 on the one hand and the valve seat 102 or a sealing insert 144 on the other hand. More specifically, the fluidic valve 100 may be free of a spring facing away from the actuator mechanism 108 for biasing the valve sealing body 104 into the valve seat 102. Descriptively speaking, such a top-sided spring may be substituted by bottom-sided actuator mechanism 108. This may keep the fluidic valve 100 compact, may strictly limit the amount of energy consumed for operating fluidic valve 100 and may, most importantly, reduce the dead volume inside the fluidic valve 100. Biasing element 128 may be connected between block 136 and a stationary body 152.

Advantageously, the actuator mechanism 108 (in particular when provided in addition to sensor mechanism 118) can be controlled to switch open at a correct opening time relative to a pumping pressure. Descriptively speaking, fluidic valve 100 may function as a self-calibrating valve. An open state or a closed state of the fluidic valve 100 may be sensed by sensing mechanism 118. Depending on the sensed present condition or state of the electroactive layer 112, the present condition or state of the fluidic valve 100 can be derived. In particular, it can be concluded whether the valve sealing body 104 rests in a sealing fashion in valve seat 102 or is still in a non-equilibrium state.

According to FIG. 2 to FIG. 4, the electroactive material of the actuator mechanism 108 is integrated in membrane 120. However, in another embodiment, it is also possible that the electroactive material of the actuator mechanism 108 is provided separately from a membrane 120 (not shown).

Figure 6:
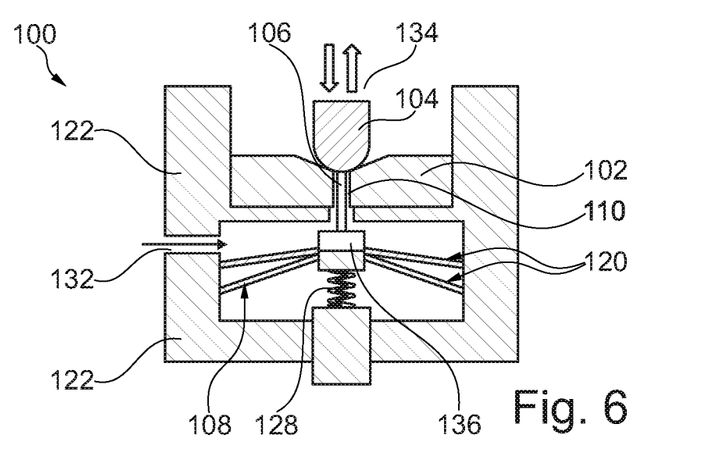
FIG. 6 shows a cross-sectional view of the fluidic valve according to FIG. 5.
Figure 7:
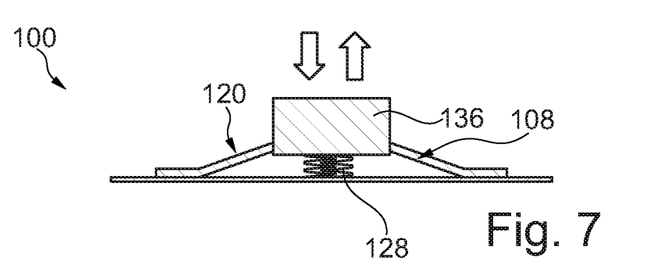
FIG. 7 shows a side view of part of the fluidic valve according to FIG. 5 and FIG. 6.

FIG. 5 shows a plan view of part of a fluidic valve 100 according to another exemplary embodiment of the present disclosure. FIG. 6 shows a cross-sectional view of the fluidic valve 100 according to FIG. 5. FIG. 7 shows a side view of part of the fluidic valve 100 according to FIG. 5 and FIG. 6.

As best seen in FIG. 5, the electroactive layer 112 and the electrode layers 114, 115 may form a continuous layer sequence. In particular, the electrode layers 114, 115 may have an annular shape. Consequently, only a single electric excitation signal needs to be applied to a respective one of said electrode layers 114, 115. This allows a simple control.

Furthermore, two membranes 120 are foreseen according to FIG. 6. For instance, a first membrane 120 facing fluid inlet 132 may be embodied as protection layer 124 and/or sealing layer 126 (see description above). Lower second membrane 120 may be embodied as actuator and/or sensor membrane (compare description above referring to reference signs 112, 114, 115).

In the illustrated DEA-setup of FIG. 5 to FIG. 7, the electroactive layer 112 (for instance a silicone foil) of the actuator membrane 120 can be covered uniformly with an electrode material of electrode layers 114, 115. When the resulting capacitor is loaded, the electroactive layer 112 may be pulled in a straight line as given by a spring force. A sealing ball may be moved or struck by the DEA accordingly.

In case of a sticking sealing ball contour, the only measure to open the fluidic valve 100 can be force (which may be advantageously reduced to save energy required) and frequency of the opening operation.

Figure 9:
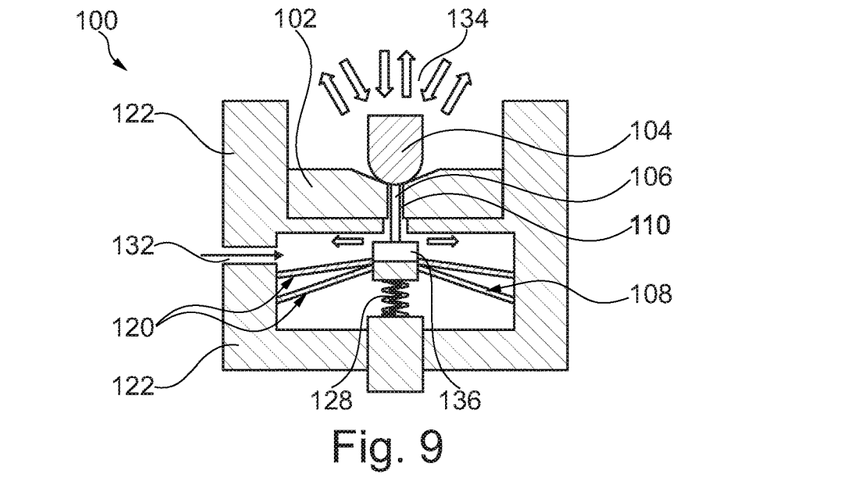
FIG. 9 shows a cross-sectional view of the fluidic valve according to FIG. 8.
Figure 10:
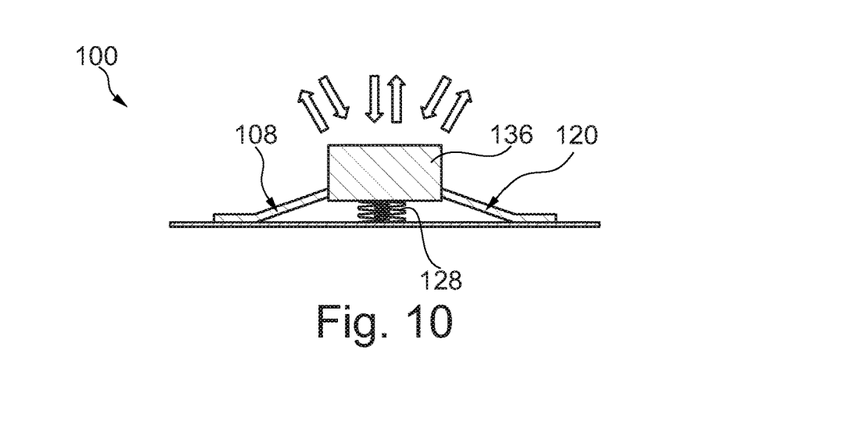
FIG. 10 shows a side view of part of the fluidic valve according to FIG. 8 and FIG. 9.

FIG. 8 shows a plan view of part of a fluidic valve 100 according to yet another exemplary embodiment of the present disclosure. FIG. 9 shows a cross-sectional view of the fluidic valve 100 according to FIG. 8. FIG. 10 shows a side view of part of the fluidic valve 100 according to FIG. 8 and FIG. 9.

Contrary to the embodiment of FIG. 5 to FIG. 7, the embodiment of FIG. 8 to FIG. 10 has electrode layers 114, 115 at least one of which being divided into a plurality of separate and mutually electrically isolated circumferential segments 116. Each segment 116 is thus actuable individually by applying a corresponding electric excitation signal to the respective segment 116 by control unit 142. This may allow to select, at a time, for instance only one of the segments 116 for exerting an asymmetric force. Such an approach may in particular allow to support swivelling, rotating and/or tumbling forces to the valve sealing body 104 which may be highly appropriate for cleaning and/or anti-sticking purposes.

In the illustrated segmented DEA setup, a continuous electroactive layer 112 (such as an actuator silicone foil) may be covered in segments 116 with an electrode material of any of electrode layers 114 and/or 115. The obtained individual capacitors (each composed of segments 116 of electrode layers 114, 115 and a corresponding portion of the continuous electroactive layer 112) may be loaded non-uniformly. Consequently, the silicone material may be pulled upward at a slant by the given spring force. The sealing ball may hence be struck in the same fashion.

In case of a sticking sealing ball contour, it may be possible to add a side force to the already possible measures to open the fluidic valve 100 (depending on the degree of guidance of the shaft).

FIG. 11 shows a cross-sectional view of a fluidic valve 100 according to still another exemplary embodiment of the present disclosure.

Contrary to the previously described embodiments, the force transmission element 106 and the valve sealing body 104 are physically separate from each other and magnetically coupled with each other in the embodiment according to FIG. 11.

In order to achieve this, at least one repellent magnet 160 may be implemented in the valve sealing body 104 and at least one further repellent magnet 162 may be implemented in the force transmission element 106. One or more other repellent magnets 164 may be implemented at or in housing 122 facing valve sealing body 104. When the actuator mechanism 108 exerts a force to the force transmission element 106 for moving the latter towards the valve sealing body 104, the repellent magnetic force between the implemented repellent magnets 160, 162 may move the valve sealing body 104, approached but not contacted by the force transmission element 106, away from the force transmission element 106. The other repellent magnet(s) 164 at or in housing 122 facing the valve sealing body 104 and facing away from the force transmission element 106 may ensure that the valve sealing body 104 returns into the valve seat 102 in the absence of a strong magnetic force exerted by the force transmission element 106 to the valve sealing body 104.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A fluidic valve, comprising:
   a valve seat;
   a valve sealing body placeable at the valve seat when the fluidic valve is closed and being displaced with respect to the valve seat when the fluidic valve is open;
   a force transmission element coupled with the valve sealing body;
   an actuator mechanism configured for actuating the force transmission element for triggering the valve sealing body to carry out an additional movement different from an opening movement and a closing movement of the valve sealing body; and
   a membrane including at least part of the actuator mechanism.

2. The fluidic valve according to claim 1, comprising at least one of the following features:
   wherein the actuator mechanism is configured for triggering the additional motion of the valve sealing body in form of a motion selected from the group consisting of: a tilting motion; a rotating motion; an oscillating motion; a tumbling motion; and a combination of at least two of the aforementioned types of motion;
   wherein the additional movement is different from an axially longitudinal motion in one direction.

3. The fluidic valve according to claim 1, wherein the actuator mechanism is configured for triggering the additional motion of the valve sealing body for cleaning at least one of the valve seat and the valve sealing body, and/or for releasing the valve sealing body and the valve seat from each other.

4. The fluidic valve according to claim 1, wherein the force transmission element comprises a rod.

5. The fluidic valve according to claim 1, comprising at least one of the following features:
   wherein the force transmission element and the valve sealing body are fixedly connected with each other;
   wherein the force transmission element and the valve sealing body are integrally formed;
   wherein the force transmission element and the valve sealing body are physically separate from each other and magnetically coupled with each other;
   wherein functionally cooperating portions of the valve sealing body and of the valve seat are spherical;
   wherein at least part of the force transmission element extends through at least part of a fluidic conduit connected to and/or forming part of the valve seat;
   wherein the actuator mechanism comprises at least one selected from the group consisting of: an electroactive material; an electroactive polymer; and a piezoelectric element.

6. The fluidic valve according to claim 1, wherein the actuator mechanism comprises an electroactive layer between two electrode layers.

7. The fluidic valve according to claim 6, comprising one of the following features:
   wherein at least one of at least one of the electrode layers and the electroactive layer is divided into segments, each segment being actuatable individually;
   wherein the electroactive layer and the electrode layers form a continuous non-segmented layer sequence.

8. The fluidic valve according to claim 1, comprising a sensor mechanism configured for sensing information indicative of at least one parameter relating to an operation of the fluidic valve.

9. The fluidic valve according to claim 8, comprising at least one of the following features:
   wherein the actuator mechanism and the sensor mechanism form an integrally combined actuator-sensor mechanism;
   wherein the actuator mechanism and the sensor mechanism comprise an electroactive material.

10. The fluidic valve according to claim 1, comprising at least one of the following features:
    wherein the membrane is fixed at a housing of the fluidic valve;
    wherein the membrane is elastic;
    wherein the membrane comprises a protection layer being resistant against chemically aggressive fluid;
    wherein the membrane comprises a sealing layer for sealing the membrane against permeation of fluid;
    wherein the membrane is arranged to couple the actuator mechanism with the force transmission element.

11. The fluidic valve according to claim 1, comprising at least one of the following features:
    comprising a biasing element configured for biasing the valve sealing body towards the valve seat, wherein the force transmission element is arranged between the biasing element and the valve sealing body;
    wherein the actuator mechanism is configured for triggering the additional movement around a center of the valve sealing body and/or around an axis of the force transmission element;
    configured as at least one selected from the group consisting of: a check valve; a passive valve; and an active valve;
    configured so that the valve seat and the valve sealing body assume a mutually bistable configuration;
    configured so that the valve seat and the valve sealing body can assume any intermediate configuration between two opposing end states.

12. A method of operating a fluidic valve according to claim 1, the method comprising:
    moving the valve sealing body between a position at the valve seat for closing the fluidic valve and a position displaced with respect to the valve seat for opening the fluidic valve; and
    actuating the force transmission element by the actuator mechanism for triggering the additional movement of the valve sealing body different from the opening movement and the closing movement of the valve sealing body.

13. A sample separation apparatus for separating a fluidic sample, the sample separation apparatus comprising:

a fluid drive for driving the fluidic sample and/or a mobile phase in which the fluidic sample is injected;

a sample separation unit for separating the fluidic sample in the mobile phase; and a fluidic valve comprising:
 a valve seat;
 a valve sealing body placeable at the valve seat when the fluidic valve is closed and being displaced with respect to the valve seat when the fluidic valve is open;
 a force transmission element coupled with the valve sealing body; and
 an actuator mechanism configured for actuating the force transmission element for triggering the valve sealing body to carry out an additional movement different from an opening movement and a closing movement of the valve sealing body.

14. The sample separation apparatus according to claim 13, comprising at least one of the following features:
 wherein the fluidic valve forms part of the fluid drive;
 wherein the fluidic valve is configured as active inlet valve of the fluid drive.

15. A sample separation apparatus for separating a fluidic sample, the sample separation apparatus comprising:
 a fluid drive for driving the fluidic sample and/or a mobile phase in which the fluidic sample is injected;
 a sample separation unit for separating the fluidic sample in the mobile phase; and
 a fluidic valve comprising:
  a valve seat;
  a valve sealing body placeable at the valve seat when the fluidic valve is closed and being displaced with respect to the valve seat when the fluidic valve is open;
  a force transmission element coupled with the valve sealing body;
  an actuator mechanism configured for actuating the force transmission element for triggering the valve sealing body to carry out a reference movement;
  a membrane including at least part of the actuator mechanism;
  a sensor mechanism configured for sensing a response to the triggered reference movement; and
  a determining unit configured for determining information indicative of at least one parameter relating to an operation of the fluidic valve.

16. The sample separation apparatus according to claim 15, comprising at least one of the following features:
 wherein the actuator mechanism and the sensor mechanism form an integrally combined actuator-sensor mechanism;
 wherein the actuator mechanism and the sensor mechanism comprise an electroactive material.

17. A sample separation apparatus for separating a fluidic sample, the sample separation apparatus comprising:
 a fluid drive for driving the fluidic sample and/or a mobile phase in which the fluidic sample is injected;
 a sample separation unit for separating the fluidic sample in the mobile phase; and
 a fluidic valve comprising:
  a valve seat;
  a valve sealing body placeable at the valve seat when the fluidic valve is closed and being displaced with respect to the valve seat when the fluidic valve is open;
  a force transmission element coupled with the valve sealing body;
  an actuator mechanism configured to actuate the force transmission element for triggering the valve sealing body to carry out an opening movement and a closing movement of the valve sealing body;
  a membrane including at least part of the actuator mechanism; and
  a sensor mechanism configured for sensing information indicative of at least one parameter relating to an operation of the fluidic valve.

18. The sample separation apparatus according to claim 17, comprising at least one of the following features:
 wherein the sensor mechanism is configured for sensing information allowing a diagnosis concerning the operation of the fluidic valve;
 wherein the sensor mechanism is configured for sensing information allowing a diagnosis concerning whether or not the fluidic valve operates properly;
 wherein the sensor mechanism comprises an electroactive material.

* * * * *